(12) United States Patent
Scherman

(10) Patent No.: US 11,287,777 B2
(45) Date of Patent: Mar. 29, 2022

(54) PACING AND PROMPTING SYSTEM AND METHOD

(71) Applicant: Moshe Scherman, Lakewood, NJ (US)

(72) Inventor: Moshe Scherman, Lakewood, NJ (US)

(*) Notice: Subject to any disclaimer, the term of this patent is extended or adjusted under 35 U.S.C. 154(b) by 0 days.

(21) Appl. No.: 17/161,866

(22) Filed: Jan. 29, 2021

(65) Prior Publication Data

US 2022/0066395 A1 Mar. 3, 2022

Related U.S. Application Data

(60) Provisional application No. 63/073,892, filed on Sep. 2, 2020.

(51) Int. Cl.
*G04F 3/02* (2006.01)
*G04B 45/00* (2006.01)

(52) U.S. Cl.
CPC .......... *G04F 3/02* (2013.01); *G04B 45/0023* (2013.01); *G04B 45/0084* (2013.01)

(58) Field of Classification Search
CPC .............. G04B 45/0023; G04B 45/003; G04B 45/0038; G04B 45/0061; G04B 45/0084; G04B 47/046; G04F 3/02; G09B 19/12; A63F 3/0497
See application file for complete search history.

(56) References Cited

U.S. PATENT DOCUMENTS

| | | | | |
|---|---|---|---|---|
| 3,595,010 A * | 7/1971 | Kaiser | ............ | G04B 19/00 368/76 |
| 3,956,879 A * | 5/1976 | Bailey | ............ | G04B 19/207 368/76 |
| 3,967,389 A * | 7/1976 | Brooks | ............ | G09B 19/12 434/304 |
| 5,216,642 A * | 6/1993 | Rikkers | ............ | G04B 45/0061 368/10 |
| 5,862,102 A * | 1/1999 | Trainello | ............ | G04B 45/0038 368/223 |
| 6,416,216 B1 * | 7/2002 | Haughey | ............ | G04B 19/082 368/107 |
| 7,339,856 B1 * | 3/2008 | Hardesty | ............ | G04B 45/0038 368/223 |
| 7,515,508 B1 * | 4/2009 | Stotz | ............ | G04B 19/082 116/282 |
| 8,295,130 B2 | 10/2012 | Claessens et al. | | |
| 8,917,580 B2 * | 12/2014 | Cedeno | ............ | G06Q 10/109 368/242 |
| 9,122,430 B1 | 9/2015 | Tedesco et al. | | |

(Continued)

FOREIGN PATENT DOCUMENTS

FR 2726099 A1 * 4/1996 ........... G04B 19/082

OTHER PUBLICATIONS

Lescure, Francois, English Translation of FR 2726099, originally published Apr. 26, 1996, retrieved from Espacenet on Apr. 22, 2021, full document (Year: 1996).*

(Continued)

*Primary Examiner* — Daniel P Wicklund
(74) *Attorney, Agent, or Firm* — The Roy Gross Law Firm, LLC; Roy Gross

(57) ABSTRACT

A system and method that enables a person to understand the concept of "a timed schedule" and/or a "timed task", so that they can more efficiently and/or effectively perform vocational and other life tasks and skills.

18 Claims, 8 Drawing Sheets

(56) References Cited

U.S. PATENT DOCUMENTS

| | | | |
|---|---|---|---|
| 2007/0147182 A1 | 6/2007 | Witchey et al. | |
| 2007/0160968 A1* | 7/2007 | Shachrur | G09B 19/12 |
| | | | 434/304 |
| 2008/0004101 A1* | 1/2008 | Hein | G07F 17/32 |
| | | | 463/20 |
| 2008/0038698 A1 | 2/2008 | Meissner et al. | |
| 2015/0378314 A1* | 12/2015 | Nakabayashi | G04F 1/005 |
| | | | 368/108 |
| 2016/0378067 A1* | 12/2016 | Bishop | G04F 3/06 |
| | | | 368/241 |
| 2021/0208543 A1* | 7/2021 | Rogers | G04F 3/08 |
| 2021/0364991 A1* | 11/2021 | McMillan, IV | G04B 19/04 |

OTHER PUBLICATIONS

Tzivi Schectman, 20 Visual Timers For Children With Special Needs, Nov. 6, 2012, 11 pp.

Amazon, Learning Resources Time Tracker Visual Timer & Clock, Blue, Ages, Nov. 10, 2020, 11 pp.

Children's Clocks for a Better Bedtime Routine | ItsTime Kids, Meet Milo, Nov. 10, 2020, 5 pp.

Google Play, Childrens Countdown Timer—Visual Timer For Kids, Fehners Software Ltd., Nov. 10, 2020, 3 pp.

Amazon, Time Timer Audible Countdown Timer, 8 Inches, Black, Visit the Time Timer Store, Nov. 10, 2020, 11 pp.

Educational App Store, Timer App for Kids—visual task countdown, Idea4e, Nov. 10, 2020, 5 pp.

\* cited by examiner

PACING AND PROMPTING SYSTEM AND METHOD

FIELD OF THE INVENTION

The present invention relates to a task and activity pacing and prompting system and method for use by a human.

BACKGROUND OF THE INVENTION

It is often difficult for children, especially young children, or those with developmental disabilities, those who have suffered brain injury or suffer with cognitive decline, to be perform routine daily tasks on a timed schedule. In other words; for all of us as young children and for those under trying circumstances in life, getting things done on time can be difficult causing unnecessary stress and drama.

Known "countdown" or "elapsed" timers use simple clocks in digital or analog form. However, many young children or those so impaired do not or cannot understand numbers; in such a way that that they cannot understand "how much time" is left for them to get ready for school or other perform other tasks. Therefore, parents and caregivers often struggle to "get their kids out the door to school and other events, despite pleading for the young children to move at a certain pace", and in like manner help an adult patient or loved one maintain or regain vocational or other life skills and life routines.

Thus, it is desired to provide a system and method that enables a person to understand the concept of "a timed schedule" and/or a "timed task", so that they can more efficiently and/or effectively perform vocational and other life tasks and skills.

SUMMARY OF THE INVENTION

It is an object of the present invention to overcome the shortcomings of the prior art.

It is an object of the present invention to provide a task and activity pacing and prompting system for use by a human.

These and other objects of the invention are achieved by providing a task and activity pacing and prompting system comprising: a countdown counter having indicia along a plane and having a starting location and a finishing location; a motivational graphical representation attached to the countdown counter via a conveyance, wherein the motivational graphical representation is configured to traverse along the plane from the starting location to the finishing location during use of the system.

In certain embodiments, the countdown counter includes a housing. In certain embodiments, the housing has indicia on the front face of the housing and has a storage space on the top of the housing to store various motivational graphical representations.

In certain embodiments, the conveyance travels along a groove in the front face of the countdown counter, such that it slides across the front face of the countdown counter.

In certain embodiments, the countdown counter has openings on its rear face such that it can be hung on a wall or at a desired place of interest for a user.

In certain embodiments, the plane is a horizontal plane.

In certain embodiments, the system includes an audio device for producing sounds of increasing, and/or decreasing tempo in correspondence with the motivational graphical representation character location along the plane.

In certain embodiments, the conveyance comprises at least one magnet for controlling the location of the motivational graphical representation along the plane.

In certain embodiments, the conveyance comprises a plurality of magnets for controlling the location of the motivational graphical representation along the plane.

In certain embodiments, the plurality of magnets attached or near to the conveyance are near the motivational graphical representation.

In certain embodiments, the countdown counter includes a spring or a spring-loaded mechanism that enables the motivational graphical representation to travel along the plane.

In certain embodiments, the device includes a motor, or a windup motor that enables the motivational graphical representation to travel along the plane.

In certain embodiments, the device has a dial that allows turning of the dial to increase the time of the countdown timer.

In certain embodiments, a user can set the starting position of the motivational graphical representation along the countdown time.

In certain embodiments, the conveyance moves at a selected rate in accordance with an elapsing amount of time.

In certain embodiments, the motivational graphical representation is inherently motivating to a child in performing activities relating to a desired goal.

In certain embodiments, the desired goal is completing tasks related to and from the group consisting of, hygiene tasks, academic tasks, housekeeping and/or household chore tasks, donning of clothing tasks, recreational and/or entertainment tasks, relaxation and/or medication tasks, and combinations thereof.

In certain embodiments, successfully completing desired goals within selected periods of time fosters in the system user improvement in task efficiency and therefore improves a system users time cognizance, time appreciation, and/or time management skills.

In certain embodiments, the motivational graphical representation is provided using a non-animated tangible item of manufacture from the group consisting of paper, cardboard, wood, or plastic panels, shaped two-dimensional items of consisting of paper, cardboard, wood, or plastic, shaped three-dimensional items of paper, cardboard, wood, or plastic, and combinations thereof.

In certain embodiments, the motivational graphical representation is provided using a non-animated tangible item of manufacture consisting of natural, semi-natural, and/or synthetic materials, and combinations thereof.

In certain embodiments, the motivational graphical representation is provided using an animated or movable tangible item of manufacture from the group consisting of paper, cardboard, wood, metal, or plastic panels, shaped two-dimensional items of consisting of paper, cardboard, wood, metal, or plastic, shaped three-dimensional items of paper, cardboard, wood, metal, or plastic, and combinations thereof.

In certain embodiments, the motivational graphical representation is provided using an animated or movable tangible item of manufacture consisting of natural, semi-natural, and/or synthetic materials, and combinations thereof.

In certain embodiments, the motivational graphical representation is provided using an animated or movable tangible item of manufacture consisting of natural, semi-natural, and/or synthetic materials, and combinations thereof.

In certain embodiments, the motivational graphical representation is provided using an electronic device.

In certain embodiments, the electronic device is from the group consisting of smart phones, smart tablets, and combinations thereof.

In certain embodiments, the system includes additional motivational graphical representations in the system that are retrofitted and replaceable and configured to different tasks of a user.

In certain embodiments, the motivational graphical representation is replaceable and is configured based upon the task and the child's interests.

Other objects of the invention are achieved by a task and activity pacing and prompting method, the method comprising the steps of: providing a countdown counter having indicia along a plane and having a starting location and a finishing location; providing a motivational graphical representation attached to the countdown counter via a conveyance; and setting the motivational graphical representation to the starting location; wherein the motivational graphical representation traverses along the plane from the starting location to the finishing location.

In certain embodiments, the method includes at least one magnet attached to the conveyance near the motivational graphical representation for controlling the location of the motivational graphical representation along the plane.

In certain embodiments, the conveyance moves at a selected rate in accordance with an elapsing amount of time.

Other objects of the invention are achieved by providing a task and activity pacing and prompting system for use by a human comprising: a motivational graphical representation and/or alphanumeric character which transverses via a conveyance along a plane including a countdown counter, the motivational graphical representation and/or alphanumeric character traversing the plane from a starting location to an finishing location; and optionally including motivational audio of steady, increasing, and/or decreasing tempo in correspondence with the countdown counter status and motivational graphical representations and/or alphanumeric character location along the plane.

Other objects of the invention are achieved by providing a task and activity pacing and prompting method for use by a human, the method comprising the steps of: providing a motivational graphical representation and/or alphanumeric character which transverses via a conveyance along a plane including a countdown counter, the motivational graphical representation and/or alphanumeric character traversing the plane from a starting location to a finishing location; and optionally providing motivational audio of steady, increasing, and/or decreasing tempo in correspondence with the countdown counter status and provided motivational graphical representations and/or alphanumeric character location along the plane.

In certain embodiments, the conveyance further comprises a magnet.

In certain embodiments, the magnets are a plurality attached to the conveyance.

In certain embodiments, the magnets attached to the conveyance are near the motivational graphical representation and/or alphanumeric character.

In certain embodiments, the conveyance moves at a selected rate in accordance with an elapsing amount of time.

In certain embodiments, the motivational graphical representation and/or alphanumeric character is inherently motivating to a child in performing activities relating to a desired goal.

In certain embodiments, the desired goal is completing tasks related to and from the group consisting of, hygiene tasks, academic tasks, housekeeping and/or household chore tasks, donning of clothing tasks, recreational and/or entertainment tasks, relaxation and/or medication tasks, and combinations thereof.

In certain embodiments, successfully completing desired goals within selected periods of time fosters in the system user improvement in task efficiency and therefore improves a system users time cognizance, time appreciation, and/or time management skills.

In certain embodiments, the motivational graphical representation and/or alphanumeric character is provided using a non-animated tangible item of manufacture from the group consisting of paper, cardboard, wood, metal, or plastic panels, shaped two-dimensional items of consisting of paper, cardboard, wood, metal, or plastic, shaped three-dimensional items of paper, cardboard, wood, metal, or plastic, and combinations thereof.

In certain embodiments, the motivational graphical representation and/or alphanumeric character is provided using a non-animated tangible item of manufacture consisting of natural, semi-natural, and/or synthetic materials, and combinations thereof.

It In certain embodiments, the motivational graphical representation and/or alphanumeric character is provided using an animated or movable tangible item of manufacture from the group consisting of paper, cardboard, wood, metal, or plastic panels, shaped two-dimensional items of consisting of paper, cardboard, wood, metal, or plastic, shaped three-dimensional items of paper, cardboard, wood, metal, or plastic, and combinations thereof.

In certain embodiments, the motivational graphical representation and/or alphanumeric character is provided using an animated or movable tangible item of manufacture consisting of natural, semi-natural, and/or synthetic materials, and combinations thereof.

In certain embodiments, the motivational graphical representation and/or alphanumeric character is provided using an animated or movable tangible item of manufacture consisting of natural, semi-natural, and/or synthetic materials, and combinations thereof.

In certain embodiments, the motivational graphical representation and/or alphanumeric character is provided using an electronic device.

In certain embodiments, the electronic device is from the group consisting of smart phones, smart tablets, and combinations thereof.

In certain embodiments, the motivational graphical representation is a bus, a soccer goal, a child's room depicted in tidy order, or another task or goal a child may have to perform and obtain.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

DETAILED DESCRIPTION OF THE INVENTION

In the following description, numerous details are set forth for the purpose of explanation. However, one of ordinary skill in the art will realize that the invention may be practiced without the use of these specific details.

In certain embodiments, the product shows an object moving towards the subject or vice versa as the need may arise. it has magnets to attach to the timer enabling the user to have many different visual uses.

In certain embodiments, the invention is directed to a task and activity pacing and prompting system for use by a human comprising: a motivational graphical representation and/or alphanumeric character which transverses via a conveyance along a plane including a countdown counter, the motivational graphical representation and/or alphanumeric character traversing the plane from a starting location to a finishing location; and optionally including motivational audio of steady, increasing, and/or decreasing tempo in correspondence with the countdown counter status and motivational graphical representations and/or alphanumeric character location along the plane.

Figure 1:
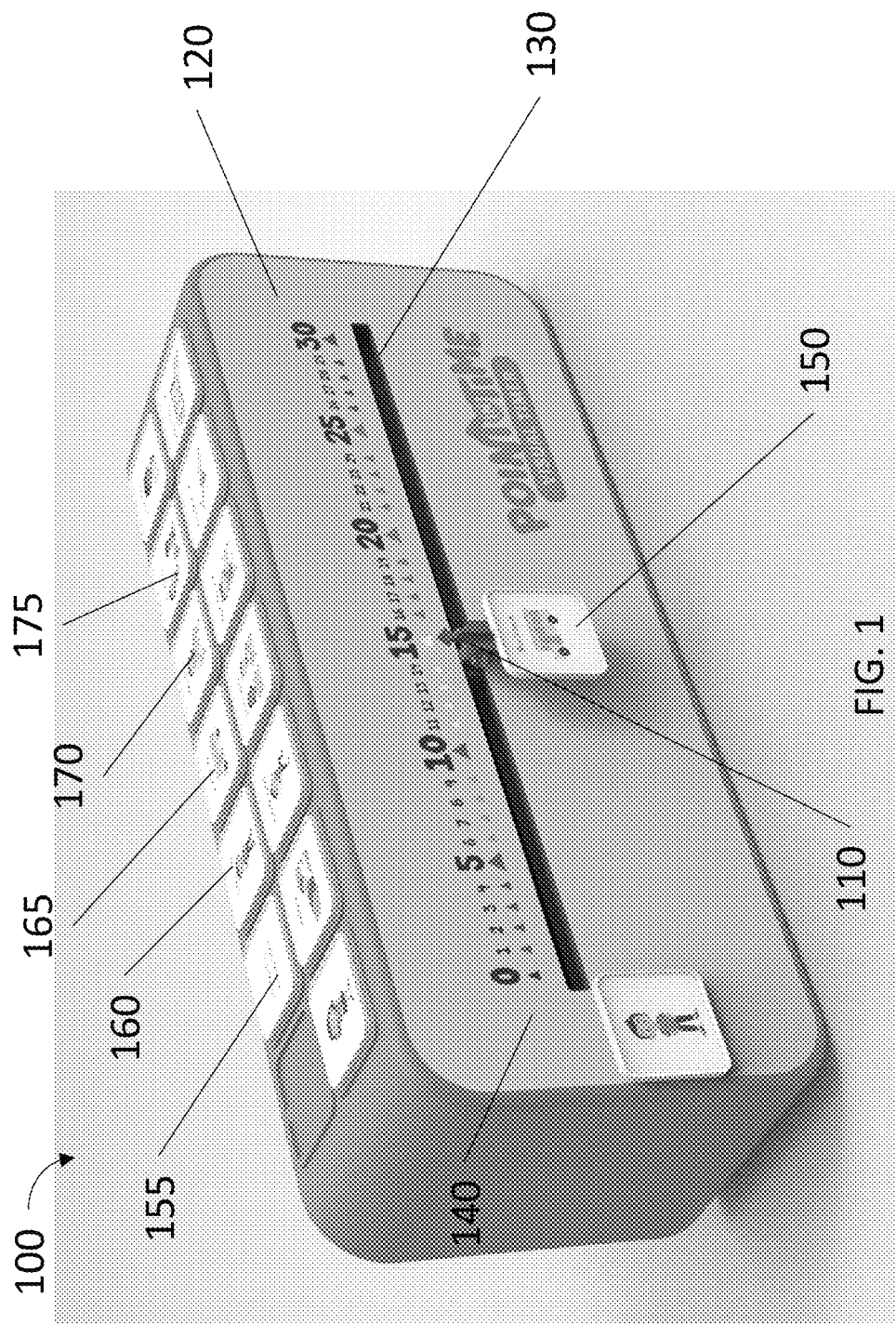
FIG. 1 a perspective front view of a visual counter of an embodiment of the invention.

As depicted in FIG. 1, in certain embodiments, it is contemplated that the system (100) conveyance (110) comprises a holder or bracket including an arrow or other indicator corresponding to time intervals, such as minutes, denoted by numeric representations (120) placed adjacent to the plane (130) being traversed by the conveyance (110). In operation, a user would manually move or set the conveyance (110) to a desired start point indicative by the numeric representation (120); and the system would then "count down the elapsed time" until the finishing point or "time is up" position (140) is reached by the conveyance (110).

In certain embodiments, it is contemplated that the system (100) includes at least one motivational graphical representation and/or alphanumeric character such as a school bus as depicted (150) which may be releasably attached to the conveyance (110) whereby visual inspection by a system user is reminded of the "task at hand" and the amount of time remaining to complete the desired task.

Figure 2A:
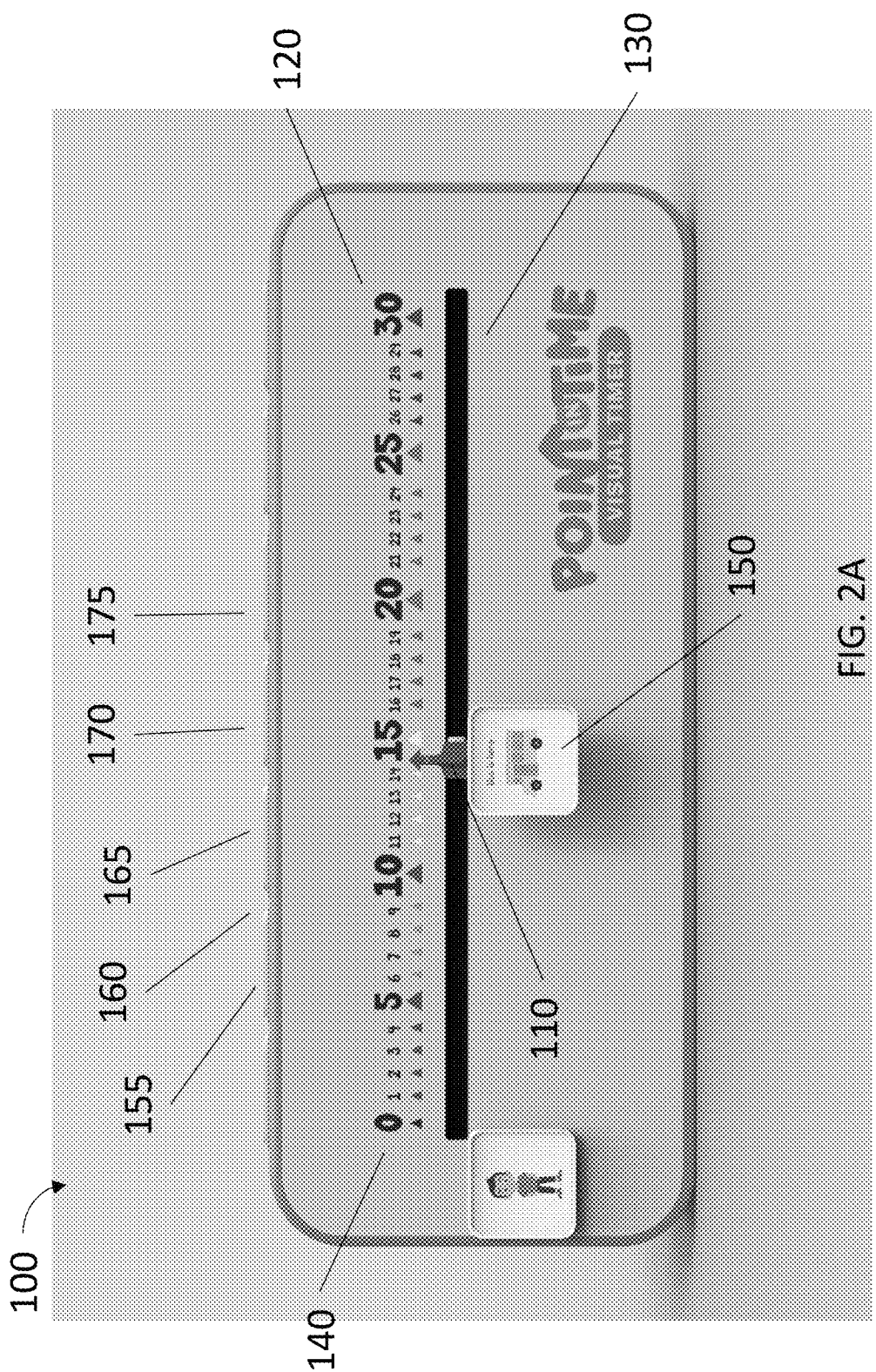
FIG. 2A a front view of a visual counter of an embodiment of the invention.
Figure 2B:
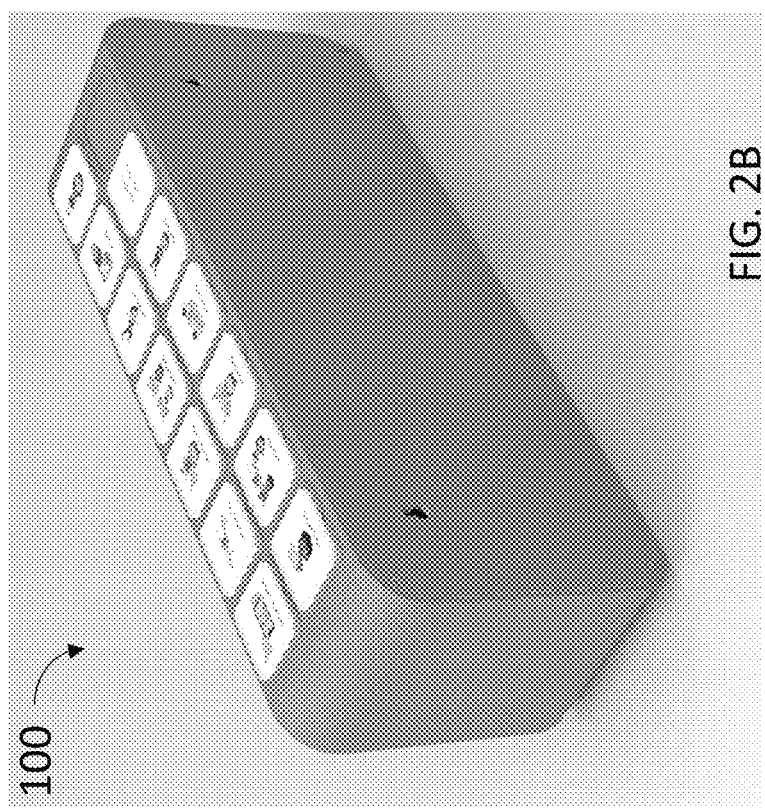
FIG. 2B is a rear view of a visual counter of an embodiment of the invention.
Figure 3:
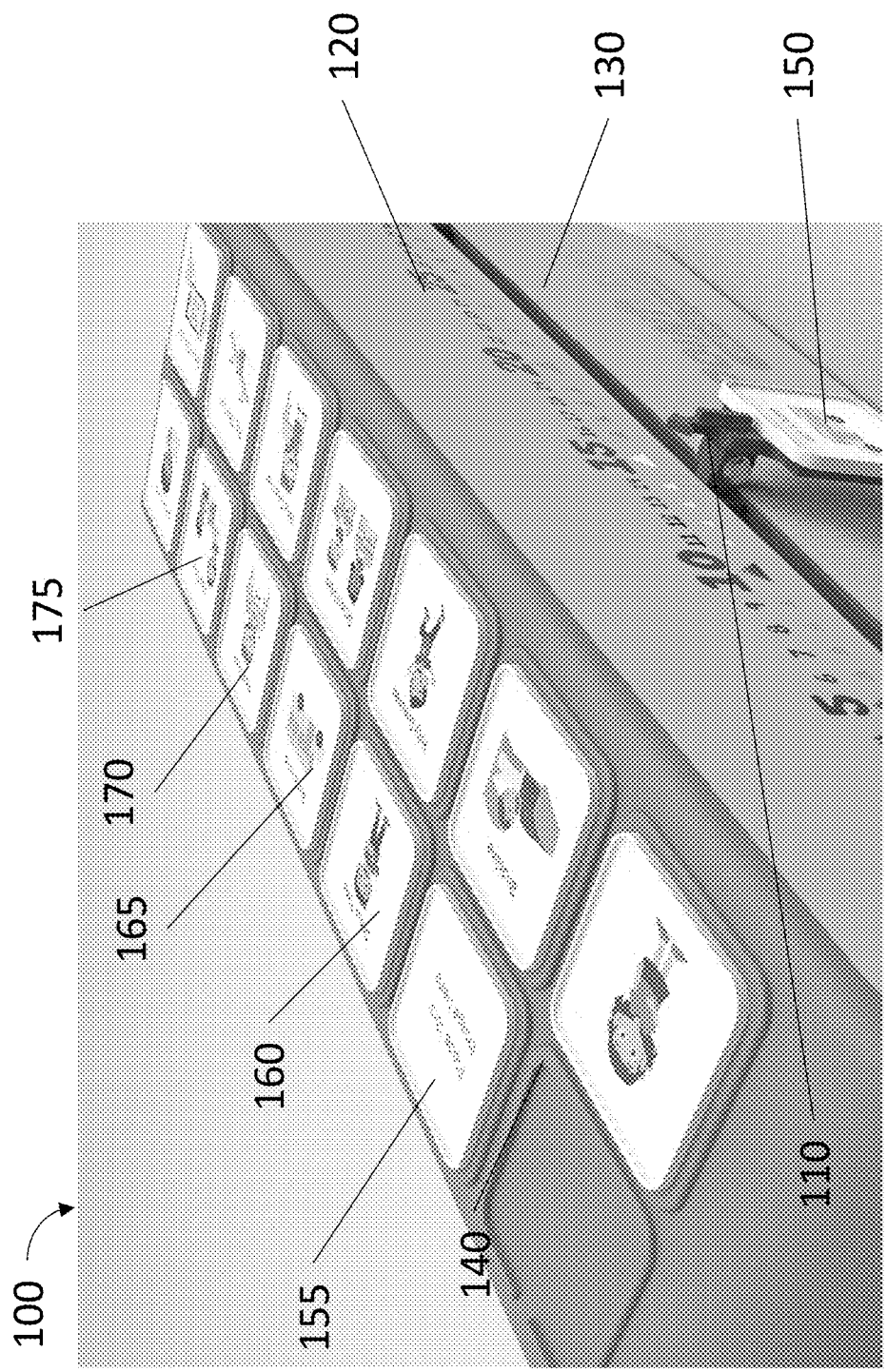
FIG. 3 a perspective front view of a visual counter of an embodiment of the invention.
Figure 4B:
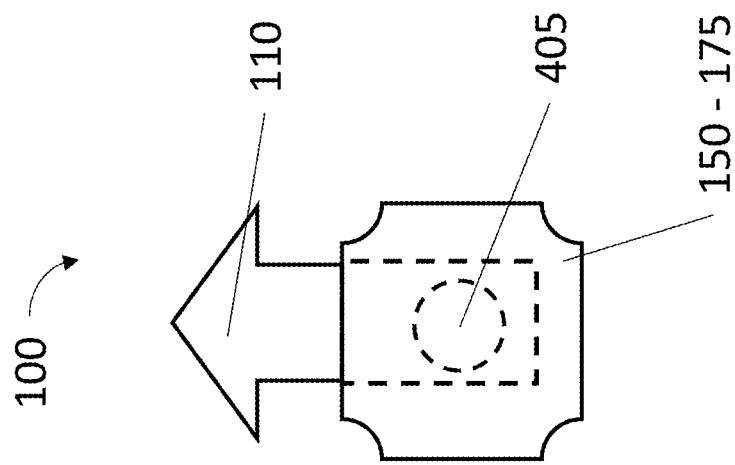
FIGS. 4A-4B depict a schematic of an embodiment of the invention.
Figure 4A:
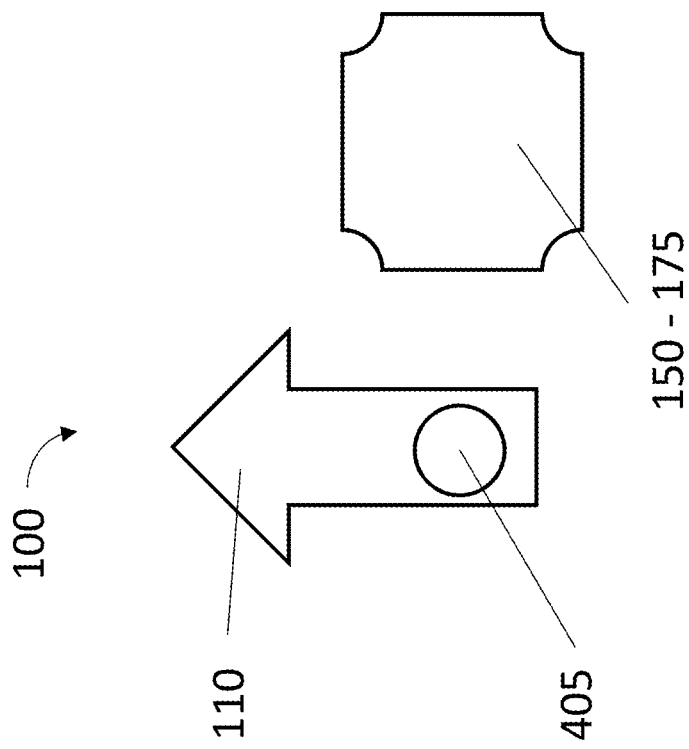
Figure 5B:
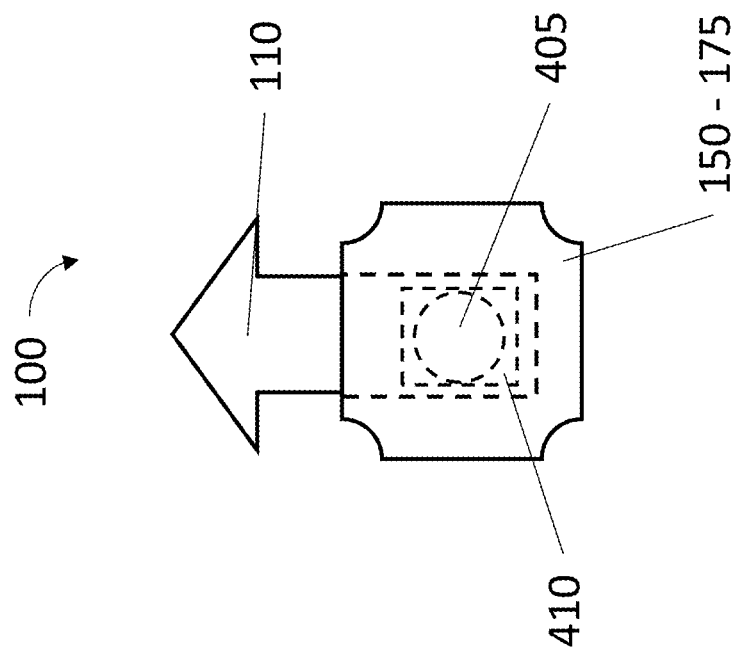
FIGS. 5A-5B depict a schematic of an embodiment of the invention.
Figure 5A:
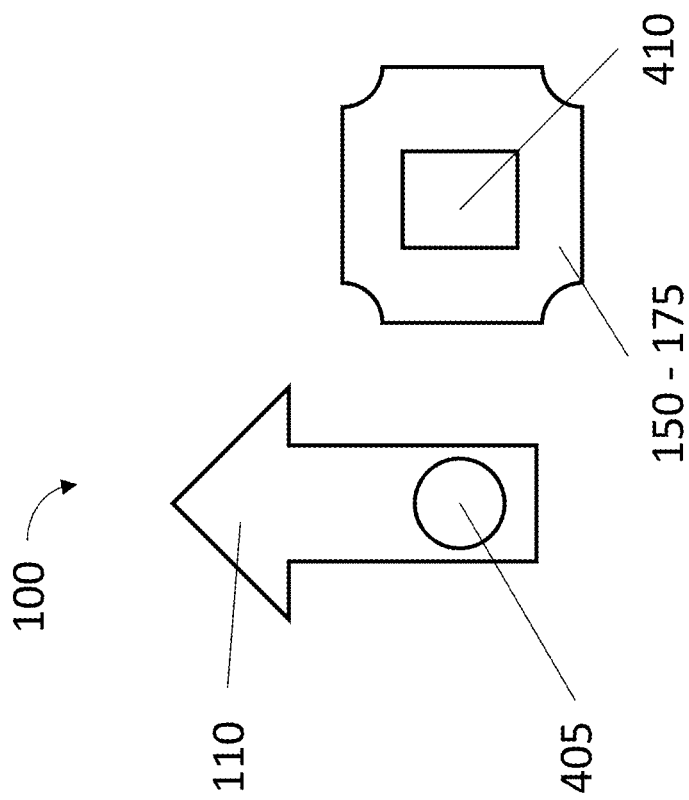

As depicted in FIGS. 1-3, the system may include a plurality of motivational graphical representations and/or alphanumeric characters (150, 155, 160, 165, 170, and 175) which may be releasably attached to the conveyance (110) to motivate a system user to complete a timed task related to the motivational graphical representation and/or alphanumeric character.

It is contemplated that a motivational graphical representation and/or alphanumeric character (150-175) may releasably attached to the conveyance (110) by a plurality of means such as magnets, Velcro, brackets, straps, gravity and shelf, or by others means which will keep a motivational graphical representation and/or alphanumeric character (150-175) attached to the conveyance (110) while the conveyance (110) traverses the plane (130).

Referring to FIGS. 4A and 4B, and FIGS. 5A and 5B; in a preferred embodiment of the invention; it is completed that a motivational graphical representation and/or alphanumeric character (150-175) may releasably attached to the conveyance (110) by at least one conveyance magnet (405) affixed to the conveyance (110), and wherein the motivational graphical representation and/or alphanumeric character (150-175) consists of, or comprises, a ferrite material; and may further include a second magnet (405) which polarity reciprocally attracts to and with the conveyance magnet (405) whereby a motivational graphical representation and/or alphanumeric character (150-175) may releasably be attached to the conveyance (110).

It is contemplated that the motivational graphical representation and/or alphanumeric character (150-175) releasably attached to the conveyance (110) is an electronic device such as but not limited to a smart device such as a smart phone or a smart tablet providing a representation, character, and/or audio which motivates the system user to complete a desired task.

It is contemplated that the conveyance (110) reaching the finish point (140) represents to a system user that "time is up" and the task or activity should be completed and the person of or for which the system is being used; stops their activities to complete a task.

It is contemplated that the conveyance (110) while traversing from the starting point (120) to the finish point (140) at a constant rate of time; the system (100) provides a motivational audio of steady, increasing, and/or decreasing tempo in correspondence with the provided motivational graphical representations and/or alphanumeric character (150) traversing along a plane (130) to help keep a system user "on pace".

The motivational audio may include music, tones, a spoken voice, and the like which provides an audio pacing to a user which augments the position and movement of the conveyance (110) along the plane (130) as an indicator of the passage of time to a system user.

It is contemplated that the conveyance (110) while traversing from the starting point (120) to the finish point (140) at a constant rate of time; the system provides a motivational audio of increasing tempo in correspondence with the provided motivational graphical representations and/or alphanumeric character (110) traversing along a plane (130) to help keep a system user "on pace".

It is contemplated that the conveyance (110) while traversing from the starting point (120) to the finish point (140) at a constant rate; the system provides a motivational audio of increasing tempo as the conveyance (110) traverses the plane (130) to the finish point (140).

Figure 6A:
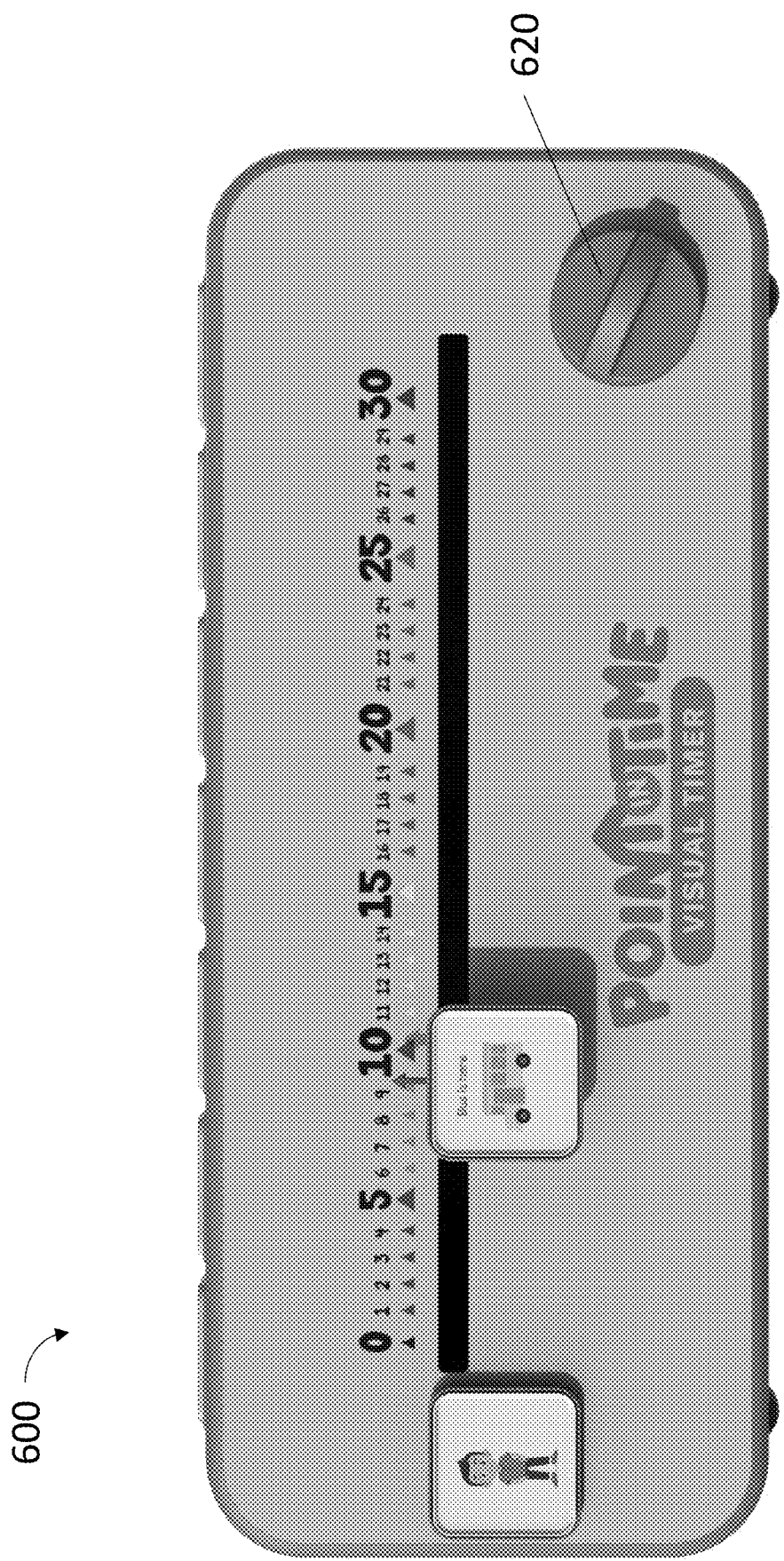
FIG. 6A is a front view of a visual counter of an embodiment of the invention.
Figure 6B:
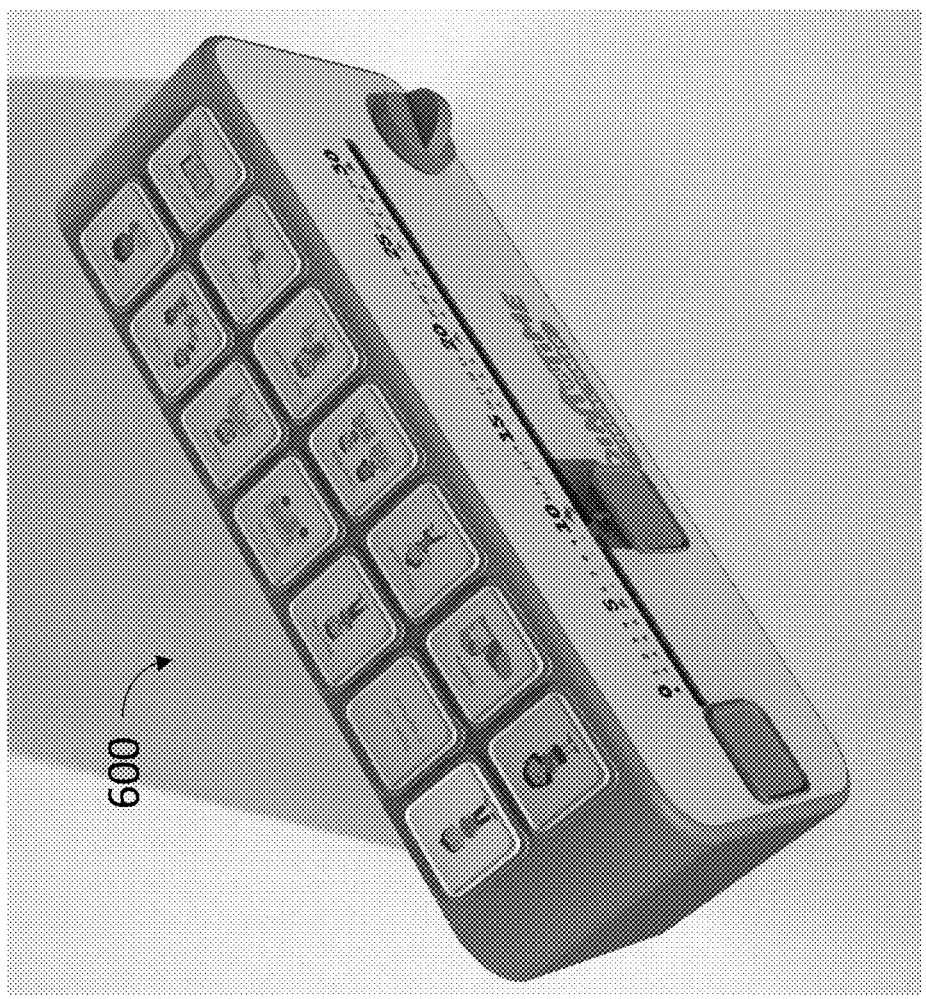
FIG. 6B is a perspective view of FIG. 6A.

FIGS. 6A-6B show an alternative embodiment of the countdown timer (600) having a dial, such that a turn of the dial counter enables to wind up and add additional time to the countdown timer for the conveyance to travel along the plane.

Having thus described several embodiments for practicing the inventive method, its advantages and objectives can be easily understood. Variations from the description above may and can be made by one skilled in the art without departing from the scope of the invention.

Accordingly, this invention is not to be limited by the embodiments as described, which are given by way of example only and not by way of limitation.

What is claimed is:

1. A task and activity pacing and prompting system comprising:

a countdown counter having indicia along a plane and having a starting location and a finishing location, the countdown timer including a top surface configured to store a plurality of interchangeable motivational representations, wherein the plurality of interchangeable motivational representations are configured to be removed by a user and used with the system;

one of the plurality of motivational graphical representation being attached to the countdown counter via a conveyance, wherein the motivational graphical representation is configured based upon the task and activity that the system is configured to pace and prompt, wherein the motivational graphical representation is configured to traverse along the plane from the starting location to the finishing location during use of the system.

2. The system of claim 1, further comprising an audio device for increasing, and/or decreasing tempo in correspondence with the motivational graphical representation character location along the plane.

3. The system of claim 1, wherein the conveyance comprises at least one magnet for controlling the location of the motivational graphical representation along the plane.

4. The system of claim 1, wherein the conveyance comprises a plurality of magnets for controlling the location of the motivational graphical representation along the plane.

5. The system of claim 4, wherein the plurality of magnets attached or next to the conveyance are near the motivational graphical representation.

6. The system of claim 1, wherein the conveyance moves at a selected rate in accordance with an elapsing amount of time.

7. The system of claim 1, wherein the motivational graphical representation is inherently motivating to a child in performing activities relating to a desired goal.

8. The system of claim 7, wherein the desired goal is completing tasks related to and from the group consisting of, hygiene tasks, academic tasks, housekeeping and/or household chore tasks, donning of clothing tasks, recreational and/or entertainment tasks, relaxation and/or medication tasks, and combinations thereof.

9. The system of claim 7, wherein successfully completing desired goals within selected periods of time fosters in the system user improvement in task efficiency and therefore improves a system users time cognizance, time appreciation, and/or time management skills.

10. The system of claim 1, wherein the motivational graphical representation is provided using a non-animated tangible item of manufacture from the group consisting of paper, cardboard, wood, or plastic panels, shaped two-dimensional items of consisting of paper, cardboard, wood, or plastic, shaped three-dimensional items of paper, cardboard, wood, or plastic, and combinations thereof.

11. The system of claim 1, wherein the motivational graphical representation is provided using a non-animated tangible item of manufacture consisting of natural, semi-natural, and/or synthetic materials, and combinations thereof.

12. The system of claim 1, wherein the motivational graphical representation is provided using an animated or movable tangible item of manufacture from the group consisting of paper, cardboard, wood, metal, or plastic panels, shaped two-dimensional items of consisting of paper, cardboard, wood, metal, or plastic, shaped three-dimensional items of paper, cardboard, wood, metal, or plastic, and combinations thereof.

13. The system of claim 1, wherein the motivational graphical representation is provided using an animated or movable tangible item of manufacture consisting of natural, semi-natural, and/or synthetic materials, and combinations thereof.

14. The system of claim 1, further comprising additional motivational graphical representations in the system that are retrofitted and replaceable and configured to different tasks of a user.

15. A task and activity pacing and prompting method, the method comprising the steps of:
providing the countdown counter according to claim 1;
attaching one of the plurality of motivational graphical representations to the countdown counter via the conveyance; and
setting the motivational graphical representation to the starting location; and
wherein the motivational graphical representation traverses along the plane from the starting location to the finishing location during use of the system.

16. The method of claim 15, further comprising at least one magnet attached to the conveyance next to the motivational graphical representation for controlling the location of the motivational graphical representation along the plane.

17. The method of claim 15, wherein the conveyance moves at a selected rate in accordance with an elapsing amount of time.

18. The system of claim 1, wherein the conveyance includes a spring loaded mechanism.

* * * * *